United States Patent
Bhowmik et al.

(10) Patent No.: US 7,065,273 B2
(45) Date of Patent: Jun. 20, 2006

(54) WIDEBAND ARRAYED WAVEGUIDE GRATING

(75) Inventors: Achintya K. Bhowmik, San Jose, CA (US); Biswajit Sur, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 161 days.

(21) Appl. No.: 10/601,151

(22) Filed: Jun. 20, 2003

(65) Prior Publication Data

US 2005/0047722 A1    Mar. 3, 2005

(51) Int. Cl.
*G02B 6/34* (2006.01)

(52) U.S. Cl. ............ 385/37; 385/31; 385/39; 385/46; 385/50

(58) Field of Classification Search ........ 385/16, 385/22, 24, 37, 42, 140, 14–15, 31–32, 43, 385/46–47, 49–50, 129, 132
See application file for complete search history.

(56) References Cited

U.S. PATENT DOCUMENTS

| | | | | |
|---|---|---|---|---|
| 5,136,671 A * | 8/1992 | Dragone | | 385/46 |
| 5,412,744 A * | 5/1995 | Dragone | | 385/24 |
| 5,467,418 A * | 11/1995 | Dragone | | 385/37 |
| 5,706,377 A * | 1/1998 | Li | | 385/37 |
| 5,841,919 A * | 11/1998 | Akiba et al. | | 385/37 |
| 5,881,199 A * | 3/1999 | Li | | 385/140 |
| 6,144,783 A * | 11/2000 | Epworth et al. | | 385/24 |
| 6,163,637 A * | 12/2000 | Zirngibl | | 385/37 |
| 6,188,818 B1* | 2/2001 | Han et al. | | 385/24 |
| 6,205,273 B1* | 3/2001 | Chen | | 385/37 |
| 6,212,315 B1* | 4/2001 | Doerr | | 385/31 |
| 6,236,781 B1* | 5/2001 | Doerr et al. | | 385/37 |
| 6,266,464 B1* | 7/2001 | Day et al. | | 385/37 |
| 6,285,810 B1* | 9/2001 | Fincato et al. | | 385/24 |
| 6,289,147 B1* | 9/2001 | Bulthuis et al. | | 385/24 |
| 6,507,680 B1* | 1/2003 | Nishimura et al. | | 385/14 |
| 6,556,746 B1* | 4/2003 | Zhao et al. | | 385/30 |
| 6,574,396 B1* | 6/2003 | Dragone | | 385/37 |
| 6,597,841 B1* | 7/2003 | Dingel | | 385/37 |
| 6,606,433 B1* | 8/2003 | Oguma et al. | | 385/37 |
| 6,728,446 B1* | 4/2004 | Doerr | | 385/37 |
| 6,807,372 B1* | 10/2004 | Lee et al. | | 398/78 |
| 2001/0010739 A1* | 8/2001 | Takiguchi et al. | | 385/15 |
| 2002/0001433 A1* | 1/2002 | Hosoi | | 385/37 |
| 2002/0015554 A1* | 2/2002 | Oguma et al. | | 385/24 |
| 2002/0071155 A1* | 6/2002 | Inada et al. | | 359/124 |
| 2002/0159703 A1* | 10/2002 | McGreer | | 385/43 |
| 2002/0191887 A1* | 12/2002 | Bidnyk | | 385/15 |
| 2003/0081898 A1* | 5/2003 | Tabuchi et al. | | 385/37 |
| 2003/0103722 A1* | 6/2003 | Naruse | | 385/24 |

(Continued)

FOREIGN PATENT DOCUMENTS

CN    WO 03/05086 A1 *    1/2003

*Primary Examiner*—Frank G. Font
*Assistant Examiner*—Ryan Lepisto
(74) *Attorney, Agent, or Firm*—Trop, Pruner & Hu, P.C.

(57) ABSTRACT

A flat-top arrayed waveguide grating with wideband transmission spectrum may be produced by integrating a series of directional couplers to the output slab waveguide coupler of a dual channel-spacing arrayed waveguide grating having Gaussian spectral profile. The primary channel spacing of the Gaussian arrayed waveguide grating determines the spectral width of the resultant wideband device, whereas the secondary channel spacing determines the wavelength separation between the adjacent output channels. In such a structure, a wideband or flat transmission spectral profile may be achieved without excessive losses.

26 Claims, 4 Drawing Sheets

U.S. PATENT DOCUMENTS

2003/0133655 A1* 7/2003 Dingel .................. 385/37
2004/0047560 A1* 3/2004 Laming et al. ............. 385/37
2004/0151432 A1* 8/2004 Tabuchi et al. ............ 385/37
2004/0213520 A1* 10/2004 Dragone .................. 385/37

* cited by examiner

WIDEBAND ARRAYED WAVEGUIDE GRATING

BACKGROUND

This invention relates generally to optical filters that may be useful for multiplexing and demultiplexing optical signals in wavelength division multiplexed communication networks.

In wavelength division multiplexed optical signals, a plurality of different optical signals, each having a different wavelength, may be multiplexed over the same optical link. At intended destinations, one or more of the wavelength signals may be separated using a demultiplexing technique.

An arrayed waveguide grating, also called a phased arrayed waveguide or phaser, works like a diffraction grating. It may be fabricated as a planar structure including input and output waveguides, input and output slab waveguides, and arrayed waveguides. The length of any arrayed waveguide may differ from adjacent waveguides by a constant $\Delta L$.

The input slab waveguide splits the wavelength channels among the arrayed waveguides. Each portion of the input light traveling through the arrayed waveguide includes all of the wavelengths that have entered the grating. Each wavelength in turn is individually phase shifted. As a result of that phase shift and phase shifts at the input/output slab waveguides, every portion of light at a given wavelength acquires different phase shifts. These portions may interfere at the output slab waveguide, producing a set of maximum light intensities. The direction of each maximum intensity depends on its wavelengths. Thus, each wavelength is directed to an individual output waveguide.

Commercially available arrayed waveguide gratings have Gaussian transmission spectral transfer functions that are easy to manufacture. However, high speed applications usually involve flat or wideband profiles. Currently, such flat spectral shapes may be achieved by introducing a horn taper of various profiles, such as parabolic, exponential, sinc, Y-splitter, and the like, at the free propagation region of the arrayed waveguide grating. However, this approach leads undesirably to higher losses than conventional arrayed waveguide gratings and poses manufacturing challenges since horn tapers are very sensitive to fabrication tolerances.

Thus, there is a need for low loss, wideband or flat top arrayed waveguide gratings.

DETAILED DESCRIPTION

Figure 1:
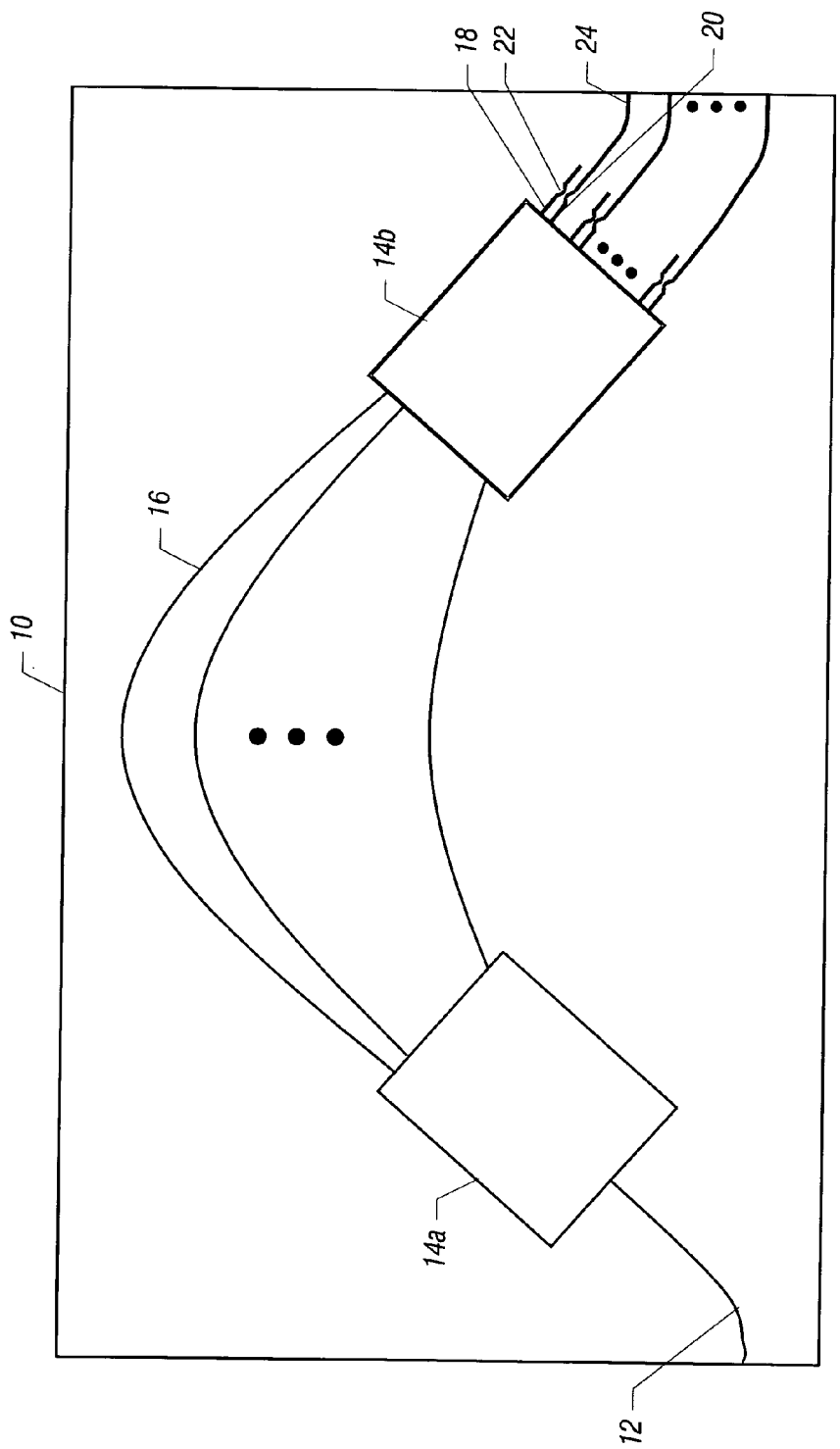
FIG. 1 is top plan view of one embodiment of the present invention.

Referring to FIG. 1, a planar lightwave circuit 10 may include an arrayed waveguide grating. An input waveguide 12 is coupled to an input slab waveguide 14a. The output waveguides 24 are coupled to an output slab waveguide 14b through a directional coupler 22. A slab waveguide, also called a free propagation region, confines light in one dimension, usually the vertical dimension, and does not significantly confine the light in another dimension, typically the horizontal dimension, such as the plane of the circuit 10.

The directional coupler 22 is coupled to the output slab waveguide 14b through the waveguides 18 and 20. In one embodiment, the directional coupler 22 may be approximately a 3-dB coupler. The waveguide array 16, connecting the slab waveguides 14a and 14b, may include a plurality of waveguides. The difference in length of the successive waveguides in the array is $\Delta L$.

Figure 2:
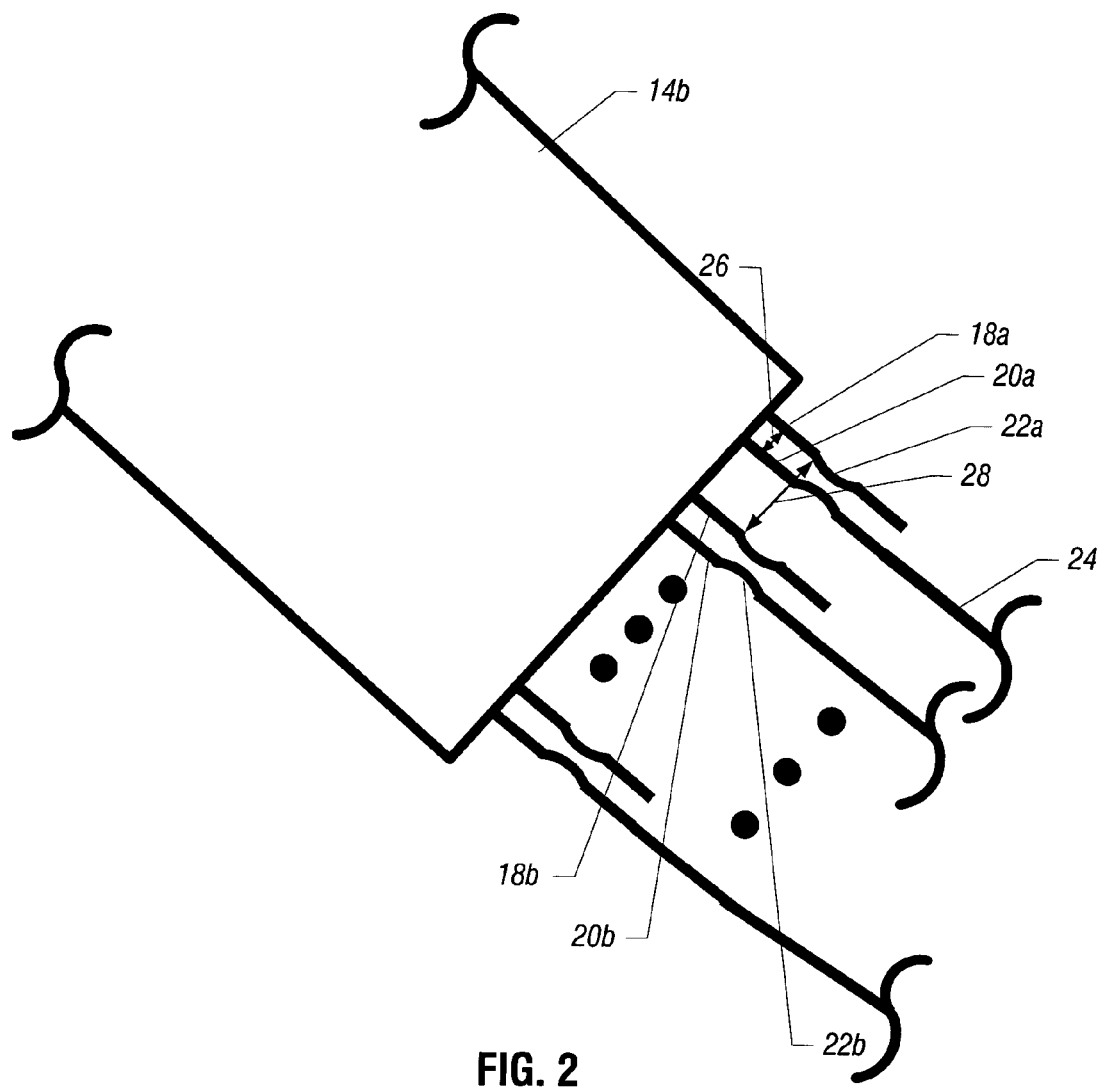
FIG. 2 is an enlarged plan view of a portion of the embodiment shown in FIG. 1.

The arrayed waveguide grating may be a dual channel spacing device with Gaussian transmission spectral profile. Referring to FIG. 2, the dual channel spacing device may consist of a primary channel spacing 26 (for example that between the waveguides 18a and 20a) and a secondary channel spacing 28 (that between the waveguides 18a and 18b). An array of directional couplers 22 are integrated with the arrayed waveguide grating to achieve the desired transmission spectral profile. The waveguide separation between the adjacent channel pairs coupled to the same couplers 22, i.e., the spacing between the waveguides 18a and 20a, 18b and 20b, on the output slab waveguide 14b, determines the overall spectral width of the transmission profile of the arrayed waveguide grating. This separation is chosen to be an appropriate fraction of the secondary channel spacing to achieve the desired balance between bandwidth, cross-talk, and insertion loss.

The phase difference between the optical beams entering the directional couplers 22 is controlled by choosing appropriate path length difference between the corresponding output waveguides 18 and 20 of the arrayed waveguide grating. As a result, light exits from the intended output waveguide 24 of the directional coupler 22.

For example, in order to get a flat spectral shape, two successive output waveguides 18 and 20 of the arrayed waveguide grating that are input to the couplers 22, have a length difference equal to approximately $(2m+1)\lambda_c/4n_{\it eff}$, where m is an integer, $\lambda_c$ is the average center wavelength, and $n_{\it eff}$ is the effective refractive index of the two respective waveguides.

Figure 3:
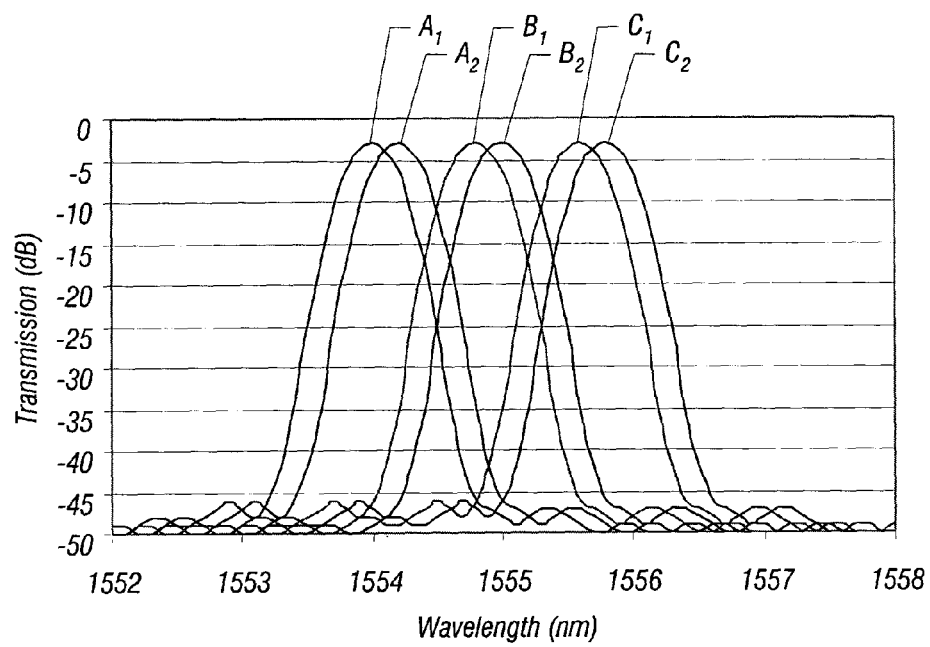
FIG. 3 is a calculated plot of transmission versus wavelength for the input to the coupler 22 of FIG. 1 in one embodiment.

FIG. 3 shows a calculated plot of transmission versus wavelength. The signals $A_1$ and $A_2$, centered on approximately 1554 nanometers, in this case, correspond to the signals from the waveguides 18a and 20a. Similarly, the spectra $B_1$ and $B_2$ are the signals from the waveguides 18b and 20b and, likewise, the signals $C_1$ and $C_2$ are the signals from the next pair of output waveguides.

Figure 4:
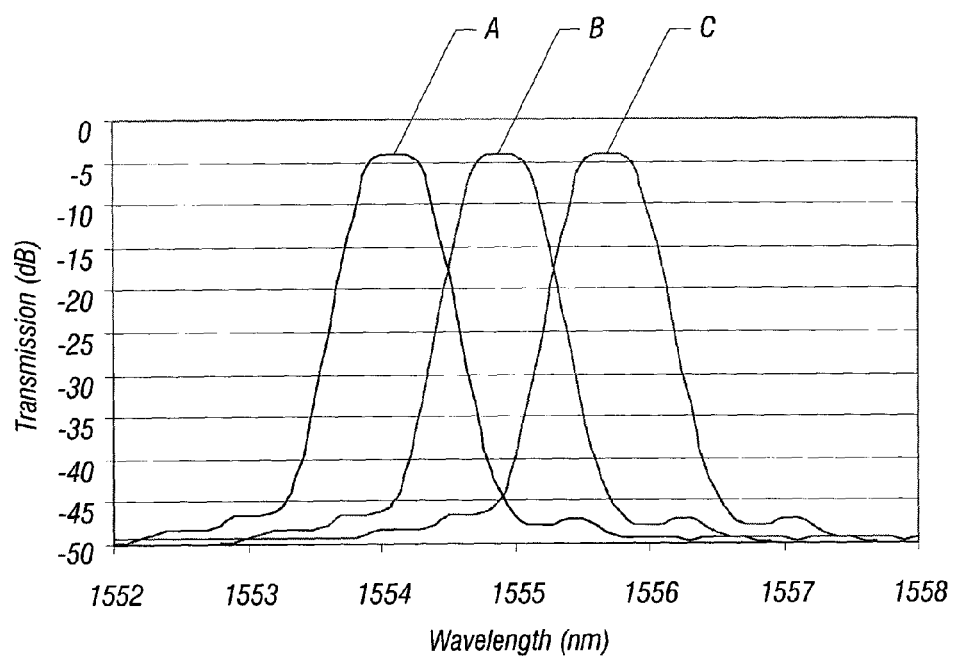
FIG. 4 is a calculated plot of transmission versus wavelength for the output from the coupler 22 shown in FIG. 1 in accordance with one embodiment of the present invention.

The primary channel spacing 26 between the signals $A_1$ and $A_2$ determines the width of the resulting signal, shown in FIG. 4, from the couplers 22. That is, the signal A is the resultant of the signals $A_1$ and $A_2$. Thus, the spacing between the signals $A_1$ and $A_2$ determines the width of the signal A. Similarly, the signal B is the resultant of the signals $B_1$ and $B_2$ by the coupler 22b.

The secondary channel spacing 28, between the signal A and the signal B, is determined by the spacing between the waveguide 18a and the waveguide 18b. This secondary channel spacing determines the wavelength separation between the adjacent output channels of the overall integrated multiplexer/demultiplexer device.

Thus, in one embodiment, the first and second waveguides 18, 20 have a primary channel spacing 26 that is about one-quarter the secondary channel spacing between the first and third waveguides 18. In other embodiments, different primary and secondary channel spacings may be desirable, but in a variety of cases, it may be desirable to space the individual waveguides 18, 20 of a pair by a smaller separation than successive waveguides 18 are spaced from one another.

Referring to FIG. 4, calculated results from a representative device of the type shown in FIG. 1 are presented for the coupler 22 output. The secondary channel spacing 28 of the Gaussian arrayed waveguide grating is 100 GHz in this example, whereas the primary spacing between the waveguides 18 and 20, coupled to the coupler 22, is four times smaller, i.e., 25 GHz, in this example. As shown in FIG. 2, the ability to obtain a flat-top spectral shape of the arrayed waveguide grating by the technique described above is demonstrated. The simulated results indicate only about a 1-dB excess loss compared to the Gaussian arrayed waveguide grating and approximately 40-dB cross-talk.

The engineering of the spectral shape of an arrayed waveguide grating can be implemented by monolithic or hybrid integration approaches. The arrayed waveguide grating and directional coupler structures may be fabricated on the same chip in the monolithic approach, while they are fabricated separately and later bonded together in the hybrid approach.

Figure 5:
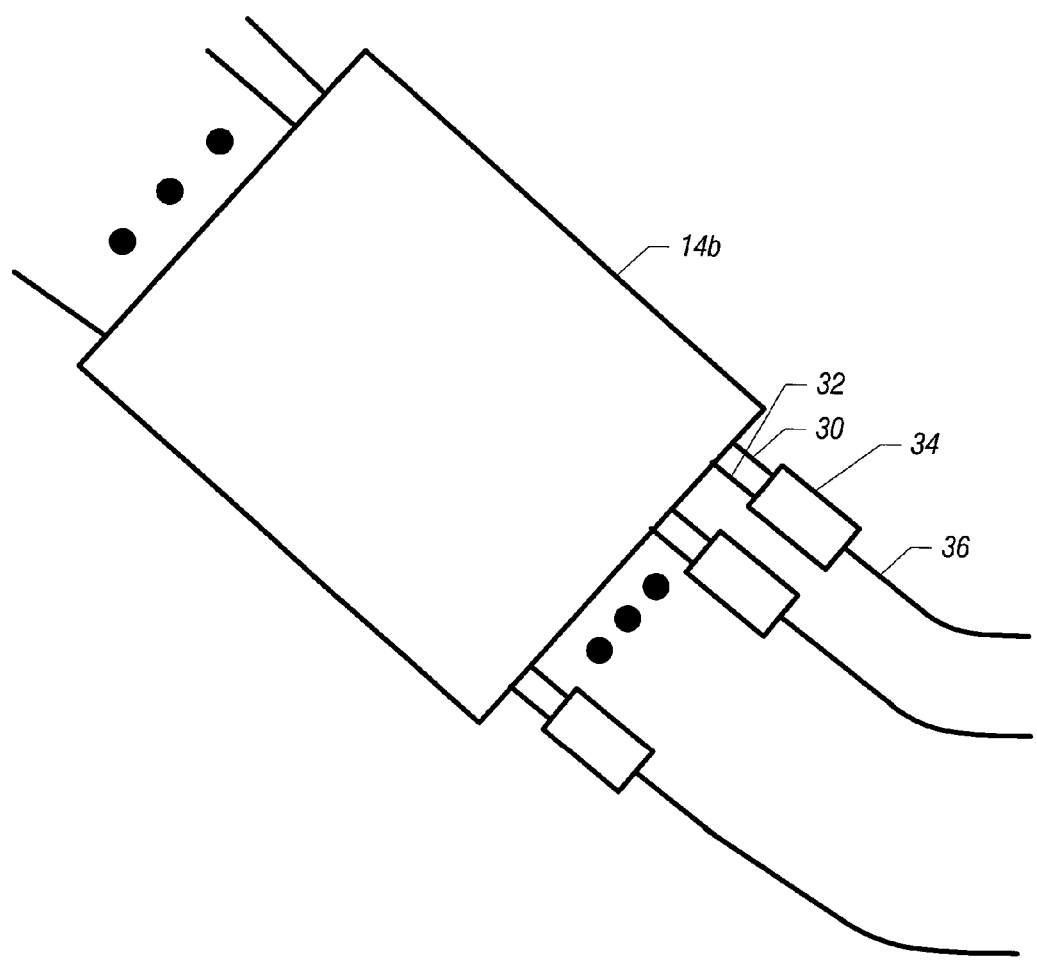
FIG. 5 is a top plan view of a portion of an alternate embodiment in accordance with one embodiment of the present invention.

Referring to FIG. 5, in accordance with another embodiment of the present invention, the slab waveguides 14b may be coupled to a multi-mode interference (MMI) coupler 34 in another embodiment of the present invention. In this embodiment, the MMI coupler 34 replaces the directional coupler 22. In this embodiment, the output waveguides 30 and 32 need not be of different lengths. However, the primary and secondary channel spacings may be as described previously in accordance with the embodiment shown in FIG. 2. As before, the coupler 34 may be coupled to an output waveguide 36.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    forming an arrayed waveguide grating including an output slab waveguide, a pair of output waveguides, and a directional coupler;
    coupling the directional coupler to said output slab waveguide;
    coupling a pair of first and second output waveguides between said output slab waveguide and directional coupler; and
    making the primary channel spacing between paired first and second waveguides coupled to the same coupler different than the secondary channel spacing between the waveguides coupled to different but adjacent couplers.

2. The method of claim 1 including making the secondary channel spacing greater than the primary channel spacing.

3. The method of claim 1, including forming the pairs of waveguides with a length difference of approximately $(2m+1)\lambda_c/4n_{\mathit{eff}}$, where m is an integer, $\lambda_c$ is the average center wavelength, and $n_{\mathit{eff}}$ is the effective refractive index of the waveguides.

4. The method of claim 1 including forming said grating on a planar light circuit.

5. The method of claim 1 including creating output signals having a flat spectral shape.

6. An arrayed waveguide grating comprising:
    an input and an output waveguide;
    a waveguide array;
    an output slab waveguide coupled to said array;
    a first and second output waveguide;
    a first directional coupler coupled to said first and second output waveguides also coupled to said slab waveguide;
    a second directional coupler coupled to said slab waveguide;
    a third output waveguide coupled to said second directional coupler; and
    wherein a primary channel spacing between output waveguides coupled to the first directional coupler is less than a secondary channel spacing between the first output waveguide coupled to a first directional coupler and the third output waveguide coupled to said second directional coupler.

7. The grating of claim 8 wherein said output waveguides coupled to the same coupler have a length difference of approximately $(2m+1)\lambda_c/4n_{\mathit{eff}}$, where m is an integer, $\lambda_c$ is the average center wavelength, and $n_{\mathit{eff}}$ is the effective refractive index of the two successive waveguides.

8. The grating of claim 6 wherein said grating is formed on a planar light circuit.

9. The grating of claim 6 wherein said grating creates output signals having a flat spectral shape.

10. The grating of claim 6 wherein said grating is a multiplexer.

11. The grating of claim 6 wherein said grating is a demultiplexer.

12. The grating of claim 6 wherein the primary channel spacing is about one quarter of the secondary channel spacing.

13. A method comprising:
    forming an arrayed waveguide grating having an output slab waveguide coupled to a pair of output waveguides having a length distance of approximately $(2m+1)\lambda_c/4n_{\mathit{eff}}$, where n is an integer, $\lambda_c$ is the average center wavelength, and $n_{\mathit{eff}}$ is the effective refractive index of two successive waveguides;
    filtering a signal using an arrayed waveguide grating; and
    adjusting the spacing between successive waveguides to generate a flat spectral output wave form.

14. The method of claim 13 including forming the grating on a planar light circuit.

15. The method of claim 13 including forming a demultiplexer.

16. The method of claim 13 including forming a multiplexer.

17. An optical filter comprising:
    an input and output waveguide coupler each having inputs and outputs;
    an array of at least three waveguides coupled between said output of said input waveguide coupler and said input of said output waveguide coupler; and a waveguide pair coupled to said output of said output waveguide coupler, said waveguide pair having a length difference adapted to produce a flat spectral output signal.

18. The method of claim 17 including forming said pair having a length difference of approximately $(2m+1)\lambda_c/4n_{eff}$, where in is an integer, $\lambda_c$ is the avenge center wavelength, and $n_{eff}$ is the effective refractive index of the two successive waveguides.

19. The filter of claim 18 wherein said filter is a demultiplexer.

20. The filter of claim 18 wherein said filter is a multiplexer.

21. The filter of claim 17 wherein said filter is formed as a planar light circuit.

22. The filter of claim 17 including a directional coupler coupled to said pair.

23. The filter of claim 17 including a plurality of waveguide pairs coupled to said output waveguide coupler.

24. A method comprising:
    forming an arrayed waveguide grating including an output slab waveguide coupled to a first and second output waveguide coupled to a first multi-mode interference coupler, said output slab waveguide also coupled to a third output waveguide coupled to a second multi-mode interference coupler adjacent said tint multi-mode interference coupler; and
    making the primary channel spacing between the first and second waveguides coupled to the first multi-mode interference coupler different than the secondary channel spacing between the first and third waveguides.

25. The method of claim 24 including making the secondary channel spacing greater than the primary channel spacing.

26. An arrayed waveguide grating comprising:
    a waveguide array;
    an output slab waveguide coupled to said array;
    first, second, third, and fourth output waveguides;
    a first multi-mode interference coupler coupled to the first and second output waveguides;
    a second multi-mode interference coupler coupled to said third and fourth output waveguides; and
    a primary channel spacing between the first and second output waveguides is less than a secondary channel spacing between the first output waveguide and the third output waveguide.

* * * * *

UNITED STATES PATENT AND TRADEMARK OFFICE
CERTIFICATE OF CORRECTION

PATENT NO. : 7,065,273 B2  Page 1 of 1
APPLICATION NO. : 10/601151
DATED : June 20, 2006
INVENTOR(S) : Achintya K. Bhowmik et al.

It is certified that error appears in the above-identified patent and that said Letters Patent is hereby corrected as shown below:

Column 4:
Line 11, delete "and an output";
Line 12, after "array", insert --coupled to said iniput waveguide--.

Column 6:
Line 2, "tint" should be --first--.

Signed and Sealed this

Nineteenth Day of September, 2006

JON W. DUDAS
*Director of the United States Patent and Trademark Office*